United States Patent
Piispanen et al.

(10) Patent No.: US 10,247,242 B2
(45) Date of Patent: Apr. 2, 2019

(54) BEARING HOUSING STRUCTURE

(71) Applicant: Visedo Oy, Lappeenranta (FI)

(72) Inventors: Mikko Piispanen, Lappeenranta (FI); Heikki Sallinen, Pulp (FI); Ville Naumanen, Lappeenranta (FI)

(73) Assignee: DANFOSS MOBILE ELECTRIFICATION OY, Lappeenranta (FI)

( * ) Notice: Subject to any disclaimer, the term of this patent is extended or adjusted under 35 U.S.C. 154(b) by 0 days.

(21) Appl. No.: 15/455,612

(22) Filed: Mar. 10, 2017

(65) Prior Publication Data

US 2017/0261035 A1 Sep. 14, 2017

(30) Foreign Application Priority Data

Mar. 11, 2016 (EP) ..................................... 16159771

(51) Int. Cl.
*F16C 19/00* (2006.01)
*F16C 33/66* (2006.01)
(Continued)

(52) U.S. Cl.
CPC .......... *F16C 33/6622* (2013.01); *F16C 19/00* (2013.01); *F16C 33/6603* (2013.01);
(Continued)

(58) Field of Classification Search
CPC .............. F16C 33/6603; F16C 33/6622; F16C 33/6659; F16C 35/042; F16C 37/007;
(Continued)

(56) References Cited

U.S. PATENT DOCUMENTS 2,809,078 A * 10/1957 Hartwig ................ F16C 37/007
384/316
3,427,081 A 2/1969 Dellinger
(Continued)

FOREIGN PATENT DOCUMENTS

CN 101 265 976 A 9/2008
CN 201 202 816 Y 3/2009
(Continued)

OTHER PUBLICATIONS

EP Search Report, dated May 11, 2016, from corresponding EP application.

*Primary Examiner* — James Pilkington
(74) *Attorney, Agent, or Firm* — Young & Thompson

(57) ABSTRACT

A bearing housing structure (101) comprises a support section (102) for supporting a bearing (117), a reception interface (103) for receiving lubrication grease, and grease channels (104-106) for conducting the lubrication grease to both sides of the bearing which are mutually opposite in the axial direction of the bearing. The bearing housing structure comprises exit conduits (107, 108) for allowing the lubrication grease to exit the bearing from the both sides of the bearing and a grease reservoir (109) for storing the lubrication grease exiting the bearing via one or more of the exit conduits. The bearing housing structure is capable of operating in different positions so that the axial direction of the bearing can be horizontal, vertical, or slanting.

11 Claims, 2 Drawing Sheets

(51) Int. Cl.
*F16C 35/04* (2006.01)
*F16N 31/00* (2006.01)

(52) U.S. Cl.
CPC ........ *F16C 33/6607* (2013.01); *F16C 35/042* (2013.01); *F16N 31/00* (2013.01); *F16C 2380/00* (2013.01)

(58) Field of Classification Search
CPC .............. F16C 2310/00; F16C 2350/26; F16C 2380/00; F16C 2380/26; F16C 33/6607; F16N 31/00
See application file for complete search history.

(56) References Cited

U.S. PATENT DOCUMENTS 4,596,476 A * 6/1986 Schill .................. F16H 57/0469
384/467
4,844,625 A 7/1989 Katsuzawa et al.

FOREIGN PATENT DOCUMENTS

| | | | |
|---|---|---|---|
| EP | 2733007 | * | 5/2014 |
| EP | 2 990 253 A1 | | 3/2016 |
| JP | 2008 005580 A | | 1/2008 |
| JP | 2010 091005 A | | 4/2010 |
| WO | 88/02945 A | | 2/1969 |

\* cited by examiner

BEARING HOUSING STRUCTURE

FIELD OF THE DISCLOSURE

The disclosure relates generally to lubrication of bearings. More particularly, the disclosure relates to a bearing housing structure that can be, for example but not necessarily, an end-shield of an electric machine. Furthermore, the disclosure relates to an electric machine for e.g. a mobile working machine. Furthermore, the disclosure relates to a mobile working machine.

BACKGROUND

Rotating machines, such as electric motors and generators, generally comprise a rotating part that is rotatably supported with respect to a stationary part with the aid of bearings which can be for example ball bearings, roller bearings, or slide bearings. Bearings of the kind mentioned above require lubrication in order to operate properly. In conjunction with ball and roller bearings, the lubrication can be for example grease lubrication, oil spray lubrication, or oil-bath lubrication. In many cases, it can be difficult or inconvenient to arrange oil spray lubrication or oil-bath lubrication and thus there is a need for grease lubrication.

The grease lubrication is typically arranged so that lubrication grease is pressed into a bearing via a grease channel that is connected to a reception interface for receiving the lubrication grease from an external source. The reception interface can be for example a grease nipple and the external source can be for example a grease gun. When new lubrication grease is pressed into the bearing, the new lubrication grease pushes old lubrication grease out from the bearing via an exit conduit. The exit conduit is typically provided with a plug which is removed in order to allow the old lubrication grease to come out when the new lubrication grease is being pressed into the bearing.

A challenge related to the above-described grease lubrication is a need for different mechanical constructions for different operating positions. For example, a grease channel and an exit conduit which are suitable for cases where the axis of rotation of a rotating part is horizontal may be unsuitable for cases where the axis of rotation is vertical. Furthermore, in machines where the axis of rotation is vertical, it may be challenging to arrange the removal of old lubrication grease from an upper bearing so that the old lubrication grease leaking out from the upper bearing is kept away from areas of the machine where it could cause harm, e.g. an airgap of an electric machine. Thus, in many machines where the axis of rotation is vertical, there is a need for a bearing housing that is external to the main body of the machine. As evident, the external bearing housing increases the complexity of the machine.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new bearing housing structure that can be, for example but not necessarily, an end-shield of an electric machine. A bearing housing structure according to the invention comprises:

a support section for supporting a bearing, a reception interface for receiving lubrication grease from an external source, grease channels for conducting the lubrication grease from the reception interface to a first room and to a second room, the first and second rooms being limited to mutually opposite sides of the bearing in an axial direction of the bearing when the support section is supporting the bearing, exit conduits for allowing the lubrication grease to exit the first and second rooms, and a grease reservoir for receiving, from one or more of the exit conduits, the lubrication grease exiting the first and second rooms via the one or more of the exit conduits and for storing the lubrication grease received from the one or more of the exit conduits.

The above-described bearing housing structure is capable of operating in different positions so that the axial direction of the bearing can be horizontal, vertical, or slanting. The ability to operate in different positions is achieved with the aid of the grease channels for conducting the lubrication grease to both sides of the bearing, with the aid of the exit conduits for allowing the lubrication grease to exit the bearing from the both sides of the bearing, and with the aid of the grease reservoir for storing the lubrication grease exiting the bearing via one or more of the exit conduits. The grease reservoir can be dimensioned to be capable of storing the whole grease consumption taking place during the lifetime of the bearing. In this exemplifying case, the grease reservoir can be emptied when the bearing is changed. The bearing can be e.g. a ball bearing, a roller bearing, or another rolling contact bearing.

In accordance with the invention, there is provided also a new electric machine. An electric machine according to the invention comprises a stator, a rotor rotatably supported to the stator with bearings, and at least one end-shield which is a bearing housing structure according to the invention. Both ends of the electric machine may comprise an end-shield which is a bearing housing structure according to the invention. It is also possible that only one end of the electric machine comprises an end-shield which is a bearing housing structure according to the invention. In this exemplifying case, the other end of the electric machine may comprise an oil lubricated bearing which can be the case for example when the electric machine is integrated with a gearbox or another machine which typically comprises oil lubricated bearings.

In accordance with the invention, there is provided also a new mobile working machine. A mobile working machine according to the invention comprises:

a combustion engine, and an electromechanical power transmission chain between the combustion engine and one or more actuators, e.g. wheels and/or chain tracks, of the mobile working machine.

The above-mentioned electromechanical transmission chain comprises at least one electric machine according to the invention.

The mobile working machine comprises preferably a liquid cooling system arranged to cool both a hydraulic system of the mobile working machine and the electromechanical power transmission chain. The mobile working machine can be, for example, a tractor, a bucket charger, a road drag, a bulldozer, or any other working machine having wheels and/or chain tracks.

It is to be noted that bearing housing structures according to embodiments of the invention can be used also in many other systems and devices than in mobile working machines of the kind described above. For example, bearing housing structures according to embodiments of the invention and electric machines according to embodiments of the invention can be used in marine applications.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
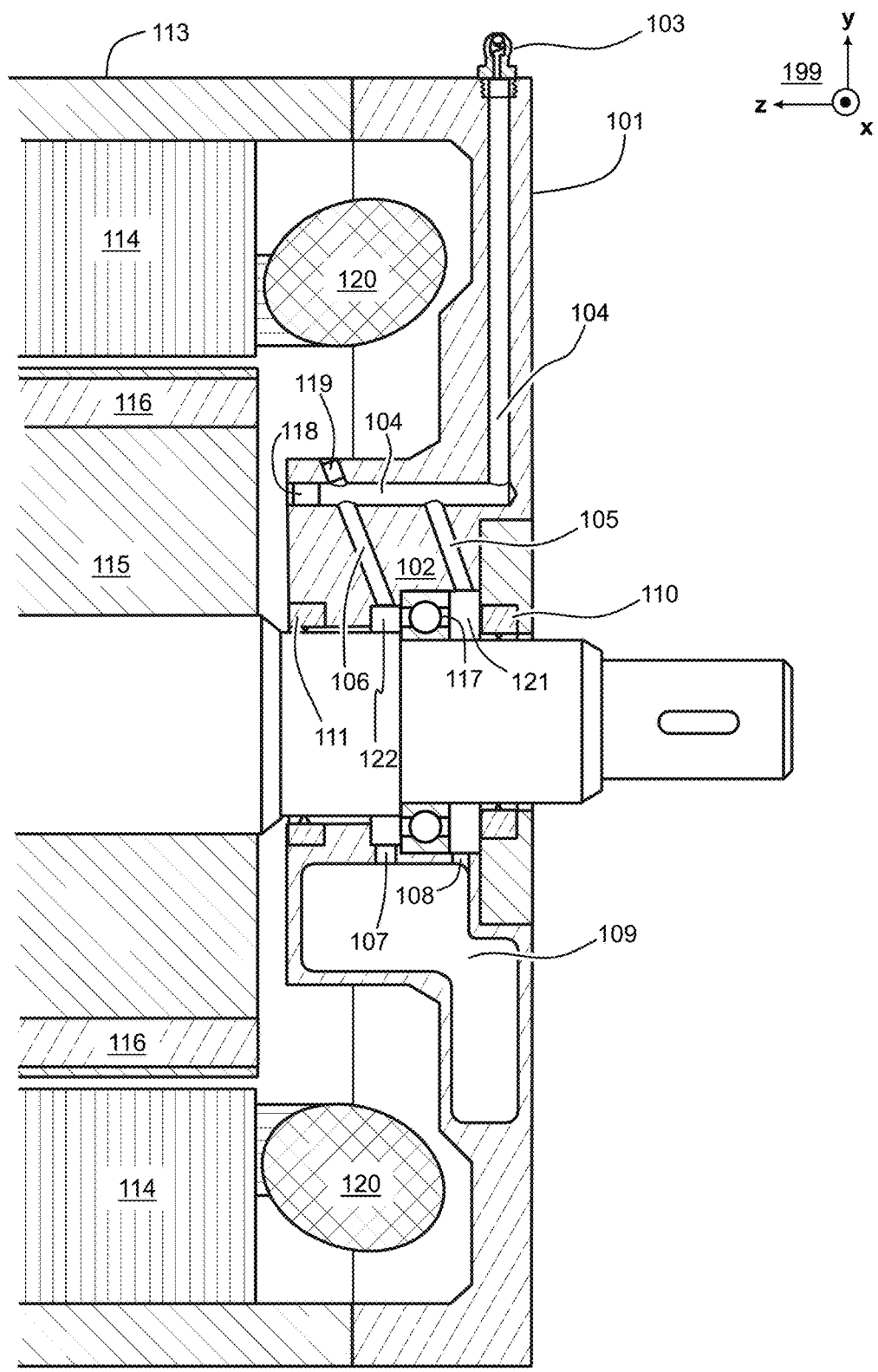
FIG. 1 shows a section view of a part of an electric machine that comprises a bearing housing structure according to an exemplifying and non-limiting embodiment of the invention.

FIG. 1 shows a section view of a part of an electric machine that comprises a bearing housing structure 101 according to an exemplifying and non-limiting embodiment of the invention. The section plane is parallel with the yz-plane of a coordinate system 199. The electric machine comprises a stator 113 and a rotor 115 which are arranged so that a magnetic flux and a torque generating interaction can be developed between these two. The rotor 115 is rotatably supported to the stator 113 with bearings. In FIG. 1, one of the bearings is denoted with a figure reference 117. In this exemplifying case, the bearing 117 is a ball bearing but the bearing could be as well a roller bearing or another rolling contact bearing. The bearing housing structure 101 constitutes an end-shield of the electric machine. The stator 113 comprises windings 120 and a core structure 114 made of ferromagnetic material and comprising a yoke and stator teeth connected to the yoke. The core structure 114 can be composed of electrically insulated ferromagnetic steel sheets stacked in the axial direction of the electric machine. The axial direction is parallel with the z-axis of the coordinate system 199. As another exemplifying alternative, the core structure 114 can be made of ferrite or iron powder composites such as SOMALOY® (Soft Magnetic Composite). The exemplifying electric machine illustrated in FIG. 1 is a permanent magnet machine whose rotor 115 comprises permanent magnet material 116. An electric machine according to another exemplifying embodiment of the invention could be as well for example an induction machine, an electrically excited synchronous machine, or a direct current "DC" machine. Furthermore, an electric machine according to an exemplifying embodiment of the invention can be either an inner rotor machine or an outer rotor machine.

The bearing housing structure 101 comprises a support section 102 for supporting the bearing 117 as illustrated in FIG. 1. The bearing housing structure 101 comprises a reception interface 103 for receiving lubrication grease from an external source. In this exemplifying case, the reception interface 103 is a grease nipple suitable for receiving lubrication grease from a grease gun. It is, however, also possible that the reception interface is merely an aperture on a surface of the bearing housing structure or another arrangement for receiving lubrication grease from an external source. The bearing housing structure 101 comprises grease channels 104, 105, and 106 for conducting the lubrication grease from the reception interface 103 to a first room 121 on a first side of the bearing 117 and to a second room 122 on a second side of the bearing 117. As illustrated in FIG. 1, the first and second rooms 121 and 122 are on mutually opposite sides of the bearing 117 in the axial direction of the bearing, i.e. in the z-direction of the coordinate system 199. In this exemplifying case, the grease channels 104-106 are borings and needless openings of the grease channels are closed with plugs 118 and 119. The bearing housing structure 101 comprises exit conduits 107 and 108 for allowing the lubrication grease to exit the first and second rooms 121 and 122. The exit conduits 107 and 108 are advantageously located, in a radial direction, on an opposite side of the bearing 117 with respect to the outlets of the grease channels 105 and 106 to the rooms 121 and 122 as illustrated in FIG. 1. Furthermore, in this exemplifying case, the bearing housing structure 101 comprises rotary shaft seals 110 and 111 on both sides of the support section 102 as illustrated in FIG. 1.

The bearing housing structure 101 comprises a grease reservoir 109 for storing the lubrication grease exiting the bearing via one or more of the exit conduits 107 and/or 108. As can be understood from FIG. 1, a part of the grease reservoir 109 is beneath the bearing 107 when the bearing housing structure 110 is in a position where the axial direction, i.e. the z-axis of the coordinate system 199, is vertical. Thus, the grease reservoir 109 is capable of storing used lubrication grease so that the used lubrication grease does not flow to the bearing also in cases where the axial direction is vertical.

Figure 2:
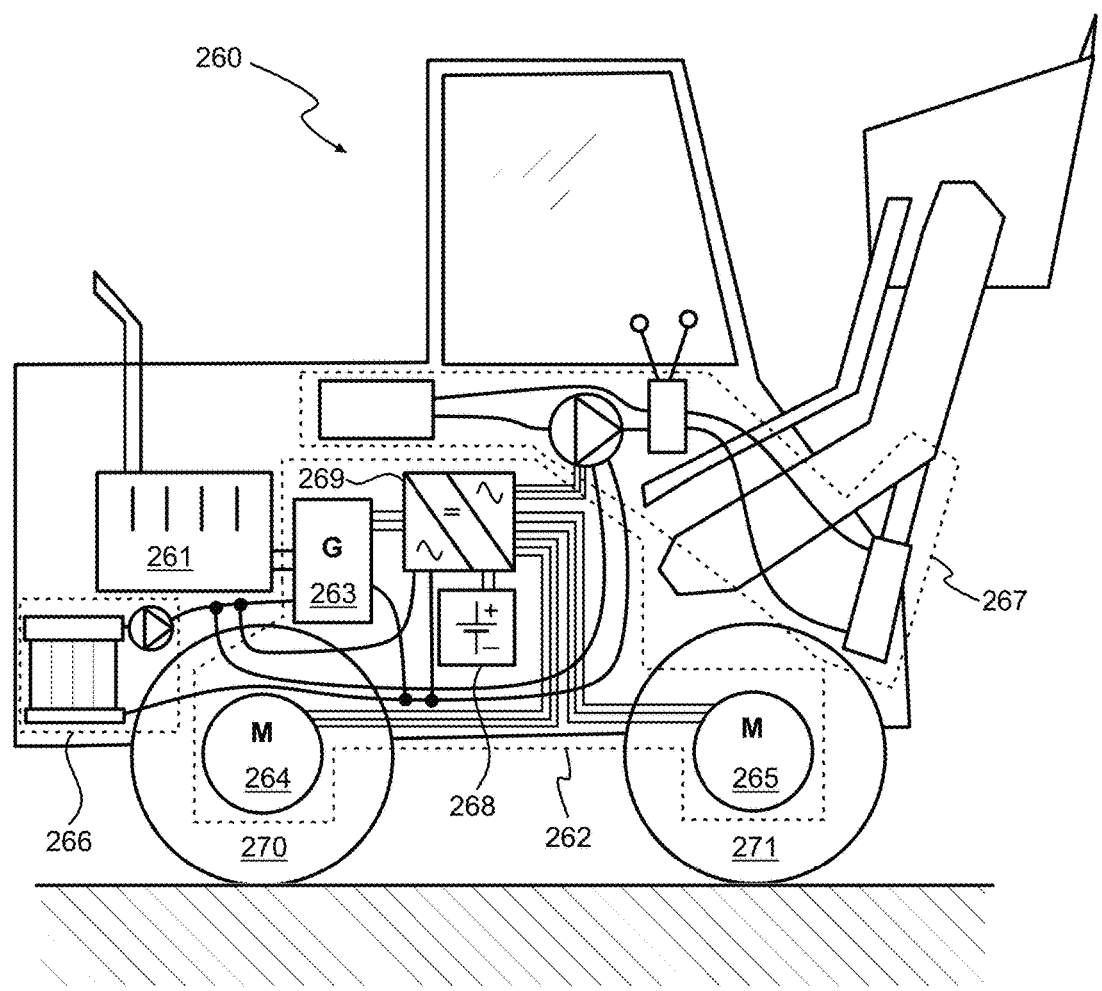
FIG. 2 shows a schematic illustration of a mobile working machine according to an exemplifying and non-limiting embodiment of the invention.

FIG. 2 shows a schematic illustration of a mobile working machine 260 according to an exemplifying and non-limiting embodiment of the invention. In this exemplifying case, the mobile working machine is a bucket charger but the mobile working machine could as well be a tractor, a road drag, a bulldozer, or any other working machine having wheels and/or chain tracks. The mobile working machine comprises a combustion engine 261 that can be e.g. a diesel engine, an Otto-cycle engine, or a turbine engine. The mobile working machine comprises an electromechanical power transmission chain 262 between the combustion engine and wheels of the mobile working machine. In FIG. 2, two of the wheels are denoted with figure references 270 and 271.

The electromechanical transmission chain 262 comprises an electric machine 263 the rotor of which is connected to the shaft of the combustion engine 261. The electromechanical transmission chain further comprises a frequency converter 269 and electric machines at the hubs of the wheels of the mobile working machine. In FIG. 2, two of the electric machines at the hubs of the wheels are denoted with figure references 264 and 265. The frequency converter 269 is arranged to convert the electric voltage produced by the electric machine 263 into electric voltages having amplitudes and frequencies suitable for the electric machines located at the hubs of the wheels. The frequency converter may have separate output stages for all the electric machines located at the hubs of the wheels in which case each of these electric machines can be controlled individually, or all the electric machines located at the hubs of the wheels can be connected to one and the same output stage of the frequency converter in which case these electric machines are controlled as a group. One or more of the electric machines comprise an end-shield that comprises:

- a support section for supporting a bearing the electric machine under consideration,
- a reception interface, e.g. a grease nipple, for receiving lubrication grease from an external source,
- grease channels for conducting the lubrication grease from the reception interface to a first room and to a second room, the first and second rooms being limited to mutually opposite sides of the bearing in the axial direction of the bearing,
- exit conduits for allowing the lubrication grease to exit the first and second rooms, and
- a grease reservoir for storing the lubrication grease exiting the first and second rooms via one or more of the exit conduits.

A mobile working machine according to an exemplifying and non-limiting embodiment of the invention comprises a liquid cooling system 266 arranged to cool the electromechanical power transmission chain 262.

A mobile working machine according to an exemplifying and non-limiting embodiment of the invention comprises a liquid cooling system arranged to cool both a hydraulic system 267 of the mobile working machine and the electromechanical power transmission chain 262.

A mobile working machine according to an exemplifying and non-limiting embodiment of the invention comprises a liquid cooling system arranged to cool both the electromechanical power transmission chain 262 and the combustion engine 261.

In a mobile working machine according to an exemplifying and non-limiting embodiment of the invention, the electromechanical power transmission chain comprises a battery 268 and/or an electric double-layer capacitor arranged to respond to peak power needs exceeding the maximum power of the combustion engine 261. The battery and/or the electric double-layer capacitor can be connected, for example, to a direct voltage intermediate circuit of the frequency converter 269. An electric double-layer capacitor is often called a "super capacitor".

It is to be noted that bearing housing structures according to embodiments of the invention can be used also in many other systems and devices than in mobile working machines of the kind described above with reference to FIG. 2. For example, bearing housing structures according to embodiments of the invention and electric machines according to embodiments of the invention can be used in marine applications.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A bearing housing structure comprising:
   a support section configured to support a bearing;
   a reception interface configured to receive lubrication grease from an external source;
   grease channels configured to conduct the lubrication grease from the reception interface to a first room and to a second room, the first and second rooms being limited to mutually opposite sides of the bearing in an axial direction of the bearing when the support section is supporting the bearing;
   exit conduits configured to allow the lubrication grease to exit the first and second rooms; and
   an enclosed grease reservoir defined entirely within the bearing housing structure and configured to receive, from one or more of the exit conduits, the lubrication grease exiting the first and second rooms via the one or more of the exit conduits, the grease reservoir being configured to store the lubrication grease received from the one or more of the exit conduits in at least two different positions of the bearing housing structure such that the axial direction of the bearing is selectively one of horizontal, vertical, and slanted.

2. The bearing housing structure according to claim 1, wherein the grease reservoir extends in the axial direction with respect to the bearing so that a part of the grease reservoir is beneath the bearing when the support section is supporting the bearing and the bearing housing structure is in a position where the axial direction of the bearing is vertical.

3. The bearing housing structure according to claim 2, wherein the exit conduits are located, in a radial direction when the support section is supporting the bearing, on an opposite side of the bearing with respect to outlets of the grease channels to the first and second rooms.

4. The bearing housing structure according to claim 2, wherein the bearing housing structure comprises rotary shaft seals on both sides of the support section.

5. The bearing housing structure according to claim 2, wherein the bearing housing structure is an end-shield of an electric machine.

6. The bearing housing structure according to claim 1, wherein the exit conduits are located, in a radial direction when the support section is supporting the bearing, on an opposite side of the bearing with respect to outlets of the grease channels to the first and second rooms.

7. The bearing housing structure according to claim 1, wherein the bearing housing structure comprises rotary shaft seals on both sides of the support section.

8. The bearing housing structure according to claim 1, wherein the bearing housing structure is an end-shield of an electric machine.

9. An electric machine comprising:
   a stator;
   a rotor rotatably supported by bearings; and
   at least one bearing housing structure configured to support at least one of the bearings, the bearing housing structure comprising:
      a support section configured to support the one of the bearings,
      a reception interface configured to receive lubrication grease from an external source, grease channels configured to conduct the lubrication grease from the reception interface to a first room and to a second room, the first and second rooms being limited to mutually opposite sides of the bearing in an axial direction of the bearing when the support section is supporting the bearing, exit conduits configured to allow the lubrication grease to exit the first and second rooms, and an enclosed grease reservoir defined entirely within the bearing housing structure and configured to receive, from one or more of the exit conduits, the lubrication grease exiting the first and second rooms via the one or more of the exit conduits, the grease reservoir being configured to store the lubrication grease received from the one or more of the exit conduits in at least two different positions of the bearing housing structure such that the axial direction of the bearing is selectively one of horizontal, vertical, and slanted.

10. A mobile working machine comprising:

a combustion engine;

one or more actuators and an electromechanical power transmission chain between the combustion engine and the one or more actuators of the mobile working machine, the electromechanical transmission chain comprising at least one electric machine comprising:

a stator, a rotor rotatably supported by bearings, and at least one bearing housing structure configured to support at least one of the bearings, the bearing housing structure comprising:

a support section configured to support the one of the bearings, a reception interface configured to receive lubrication grease from an external source, grease channels configured to conduct the lubrication grease from the reception interface to a first room and to a second room, the first and second rooms being limited to mutually opposite sides of the bearing in an axial direction of the bearing when the support section is supporting the bearing, exit conduits configured to allow the lubrication grease to exit the first and second rooms, and an enclosed grease reservoir defined entirely within the bearing housing structure and configured to receive, from one or more of the exit conduits, the lubrication grease exiting the first and second rooms via the one or more of the exit conduits, the grease reservoir being configured to store the lubrication grease received from the one or more of the exit conduits in at least two different positions of the bearing housing structure such that the axial direction of the bearing is selectively one of horizontal, vertical, and slanted.

11. The mobile working machine according to claim 10, further comprising a liquid cooling system configured to cool both the electromechanical power transmission chain and a hydraulic system of the mobile working machine.

* * * * *